US006818678B2

(12) United States Patent
Yamaguchi et al.

(10) Patent No.: US 6,818,678 B2
(45) Date of Patent: Nov. 16, 2004

(54) RESIN COMPOSITION COMPRISING PARTICLES

(75) Inventors: Yoshikazu Yamaguchi, Ibaraki (JP); Takao Yashiro, Ibaraki (JP); Isao Nishiwaki, Toride (JP); Takashi Ukachi, Ibaraki (JP)

(73) Assignees: DSM IP Assets B.V., Heerlen (NL); JSR Corporation, Tokyo (JP); Japan Fine Coatings Co., Ltd., Tokyo (JP)

( * ) Notice: Subject to any disclaimer, the term of this patent is extended or adjusted under 35 U.S.C. 154(b) by 0 days.

(21) Appl. No.: 10/073,075

(22) Filed: Feb. 12, 2002

(65) Prior Publication Data

US 2003/0065050 A1 Apr. 3, 2003

Related U.S. Application Data

(63) Continuation of application No. PCT/NL00/00537, filed on Jul. 27, 2000.

(30) Foreign Application Priority Data

Aug. 12, 1999 (JP) .............................. 11-228296

(51) Int. Cl.$^7$ .......................... C08F 2/46; C09D 175/04
(52) U.S. Cl. .............................. 522/35; 522/36; 522/42; 522/99; 522/96; 522/173; 522/172
(58) Field of Search .............................. 522/35, 33, 42, 522/182, 184, 83, 36, 96, 99, 173, 172, 21; 524/783; 526/107, 170, 128, 192

(56) References Cited

U.S. PATENT DOCUMENTS

| | | | | |
|---|---|---|---|---|
| 4,672,079 A | * | 6/1987 | Li Bassi et al. | 522/35 |
| 4,950,795 A | * | 8/1990 | Husler et al. | 568/331 |
| 6,013,749 A | * | 1/2000 | Baba et al. | 526/279 |
| 6,355,703 B1 | * | 3/2002 | Baba et al. | 522/182 |
| 6,521,677 B2 | * | 2/2003 | Yashiro et al. | 523/212 |

FOREIGN PATENT DOCUMENTS

| | | |
|---|---|---|
| EP | 0433727 | 6/1991 |
| JP | 06240181 | 8/1994 |
| JP | 09118838 | 5/1997 |
| WO | 9712942 | 1/1997 |

* cited by examiner

*Primary Examiner*—Susan Berman
(74) *Attorney, Agent, or Firm*—Mayer, Brown, Rowe & Maw LLP

(57) ABSTRACT

A resin composition comprising: (A) particles prepared by bonding at least one oxide of an element selected from the group consisting of silicon, aluminum, zirconium, titanium, zinc, germanium, indium, tin, antimony, and cerium, and an organic compound which includes a polymerizable unsaturated group, (B) an oligomer-type radiation polymerization initiator having a site which generates photo-radicals by irradiation of radioactive rays, and (C) a compound having at least two polymerizable unsaturated groups in the molecule.

13 Claims, No Drawings

RESIN COMPOSITION COMPRISING PARTICLES

CROSS-REFERENCE TO RELATED APPLICATIONS

This Application is a continuation of International Application PCT/NL00/00537, filed Jul. 27, 2000, which designated the U.S. and was published in the English language. The entire contents of this PCT application are hereby incorporated by reference.

FIELD OF THE INVENTION

The present invention relates to a resin composition comprising particles and a cured product made from the composition.

PRIOR ART

In recent years, a resin composition exhibiting excellent coatability and capable of forming coatings with high hardness, superior scratch resistance, low curling properties, superb adhesion, and excellent transparency and appearance is desired as a protective coating material to prevent stains or scratches on the surface of various substrates, an adhesive for various substrates, a sealing material, or a vehicle for printing ink. Various materials comprising colloidal silica have been proposed with an objective to improve scratch resistance among these required characteristics. For example, U.S. Pat. No. 3,451,838 and U.S. Pat. No. 2,404,357 disclose compositions comprising a hydrolyzate of alkoxysilane and colloidal silica as major components to be used as a heat-curable coating material. Japanese Patent Publication No. 21815/1987 discloses a composition for a photocurable coating material comprising an acrylate and particles of colloidal silica of which the surface is modified by methacryloxy silane. A feature of these coating materials is to improve performance of the coating materials by treating the surface of silica particles with a specific organic silane or under specific conditions. However, these coating materials do not necessarily satisfy satisfactorily all of the requirements such as coatability, high hardness, superior scratch resistance, low curling properties, and superb adhesion, when made into coatings. Specifically, to increase hardness of the coatings, a crosslinking density of the coatings must be increased after cure. However, an increase in the hardness accompanies cure shrinkage of the coatings, which produced a large curl. To have well balanced hardness and low curl properties is thus difficult.

PROBLEMS TO BE SOLVED BY THE INVENTION

The present invention has been completed in view of the above-described problems and has an object of providing a resin composition exhibiting excellent coatability and capable of forming coatings with high hardness, superior scratch resistance, low curling properties, and superb adhesion, particularly well balanced high hardness and low curling properties, on the surface of various substrates, such as, for example, plastics (polycarbonate, polymethylmethacrylate, polystyrene, polyester, polyolefin, epoxy resins, melamine resins, triacetyl cellulose resins, ABS resins, AS resins, norbornene resins, etc.), metals, woods, papers, glasses, and slates, as well as the cured products made from the resin composition. The resin composition and the cured product are suitable for use, for example, as a protective coating material to prevent stains or scratches on plastic optical parts, touch panels, film-type liquid crystal elements, plastic containers, or flooring materials, wall materials, and artificial marbles which are used for architectural interior finish; as an adhesive for various substrates, a sealing material, and a vehicle for printing ink; and the like.

MEANS FOR SOLVING THE PROBLEMS

As a result of extensive studies, the present inventors have found that the products with well balanced high hardness and low curling properties can be achieved by a resin composition comprising: (A) particles produced by bonding oxide particles of specific element and an organic compound containing a polymerizable unsaturated group (preferably the specific organic compound of formula (1)

wherein X represents NH, O (oxygen atom), or S (sulfur atom), and Y represents O or S), (B) a specific oligomer-type radiation polymerization initiator, and (C) a compound having at least two polymerizable unsaturated groups in the molecule; and cured products of the resin composition.

PREFERRED EMBODIMENT OF THE INVENTION

The resin composition and the cured products thereof of the present invention will now be described in more detail.

I. Resin Composition

The resin composition of the present invention comprises (A) particles produced by bonding oxide particles of specific element and an organic compound containing a polymerizable unsaturated group (preferably the specific organic compound of the above formula (1)) (such particles may be called "crosslinkable particles (A)"), (B) an oligomer-type radiation polymerization initiator having a site which produces photo-radicals by radiation (hereinafter may be called "oligomer-type radiation polymerization initiator"), and (C) a compound having at least two polymerizable unsaturated groups in the molecule (hereinafter may be called "compound (C)").

Each component for the resin composition of the present invention will be described in more detail.

1. Crosslinkable Particles (A)

The crosslinkable particles (A) used in the present invention are the particles produced by bonding particles of at least one oxide of an element selected from the group consisting of silicon, aluminum, zirconium, titanium, zinc, germanium, indium, tin, antimony, and cerium, and an organic compound containing a polymerizable unsaturated group (preferably an organic compound containing the group shown by the above formula (1)).

(1) Oxide Particles

For obtaining uncolored cured coatings from the resin composition, the oxide particles used in the present invention should be particles of at least one oxide of an element selected from the group consisting of silicon, aluminum, zirconium, titanium, zinc, germanium, indium, tin, antimony, and cerium.

As these oxides, for example, silica, alumina, zirconia, titania, zinc oxide, germanium oxide, indium oxide, tin oxide, indium-tin oxide (ITO), antimony oxide, and cerium oxide can be given. Of these, silica, alumina, zirconia, and antimony oxide are preferable from the viewpoint of high hardness. These compounds may be used either individually or in combination of two or more. In addition, oxide particles of these elements are preferably in the form of a powder or a solvent dispersion sol. When the oxide particles are in the form of dispersion, an organic solvent is preferable as a dispersion medium from the viewpoint of mutual solubility with other components and dispersibility. As examples of such organic solvents, alcohols such as methanol, ethanol, isopropanol, butanol, and octanol; ketones such as acetone, methyl ethyl ketone, methyl isobutyl ketone, and cyclohexanone; esters such as ethyl acetate, butyl acetate, ethyl lactate, and γ-butyrolactone; ethers such as ethylene glycol monomethyl ether and diethylene glycol monobutyl ether; aromatic hydrocarbons such as benzene, toluene, and xylene; and amides such as dimethylformamide, dimethylacetamide, and N-methylpyrrolidone can be given. Of these, methanol, isopropanol, butanol, methyl ethyl ketone, methyl isobutyl ketone, ethyl acetate, butyl acetate, toluene, and xylene are preferable.

The number average particle diameter of the oxide particles is from 0.001 $\mu$m to 2 $\mu$m, preferably from 0.001 $\mu$m to 0.2 $\mu$m, and more preferably from 0.001 $\mu$m to 0.1 $\mu$m. If the number average particle diameter is more than 2 $\mu$m, transparency of the cured product and surface conditions of the coating tend to be impaired. Moreover, various surfactants and amines may be added to improve dispersibility of particles.

Among silicon oxide particles, given as examples of commercially available products of silica particles are colloidal silica available under the trade names Methanol Silica Sol, IPA-ST, MEK-ST, NBA-ST, XBA-ST, DMAC-ST, ST-UP, ST-OUP, ST-20, ST-40, ST-C, ST-N, ST-O, ST-50, ST-OL, etc., manufactured by Nissan Chemical Industries, Ltd. As powdery silica, products available under the trade names AEROSIL 130, AEROSIL 300, AEROSIL 380, AEROSIL TT600, and AEROSIL OX50 (manufactured by Japan Aerosil Co., Ltd.), Sildex H31, H32, H51, H52, H121, H122 (manufactured by Asahi Glass Co., Ltd.), E220A, E220 (manufactured by Nippon Silica Industrial Co., Ltd.), SYLYSIA470 (manufactured by Fuji Silycia Chemical Co., Ltd.) and SG Flake (manufactured by Nippon Sheet Glass Co., Ltd.), and the like can be given.

Given as commercially available products of aqueous dispersion products of alumina are Alumina Sol-100, -200, -520 (trade names, manufactured by Nissan Chemical Industries, Ltd.); as an isopropanol dispersion of alumina, AS-150I (trade name, manufactured by Sumitomo Osaka Cement Co., Ltd.); as a toluene dispersion of alumina, AS-150T (trade name, manufactured by Sumitomo Osaka Cement Co., Ltd.); as an aqueous dispersion product of zinc antimonate powder, Celnax (trade name, manufactured by Nissan Chemical Industries, Ltd.); as powders and solvent dispersion products of alumina, titanium oxide, tin oxide, indium oxide, zinc oxide, etc., Nano Tek, for example, (trade name, manufactured by CI Kasei Co., Ltd.); as an aqueous dispersion sol of antimony dope-tin oxide, SN-100D (trade name, manufactured by Ishihara Sangyo Kaisha, Ltd.); as an ITO powder, a product manufactured by Mitsubishi Material Co., Ltd.; and as an aqueous dispersion of cerium oxide, Needral (trade name, manufactured by Taki Chemical Co., Ltd.).

The shape of oxide particles may be globular, hollow, porous, rod-like, plate-like, fibrous, or amorphous, with a globular shape being preferable. The specific surface area of oxide particles (determined by a BET method using nitrogen) is preferably in the range from 10 to 1000 $m^2/g$, and more preferably 100 to 500 $m^2/g$. These oxide particles can be used either in the form of a dry powder or a dispersion in water or an organic solvent. For example, a dispersion liquid of fine particles of oxide known in the art as a solvent dispersion sol of these oxides can be used. Use of a solvent dispersion sol of oxide is particularly desirable in the application in which excellent transparency of cured products is required.

(2) Organic Compound

The organic compound used in the present invention is a compound having a polymerizable unsaturated group in the molecule, and preferably a specific organic compound comprising the group shown by the above-mentioned formula (1), [—X—C (=Y)—NH—]. In addition, the organic compound preferably includes a group represented by [—O—C(=O)—NH—] and at least one of the groups represented by [—O—C(=S)—NH—] or [—S—C(=O)—NH—]. It is preferable that such organic compounds have a silanol group or a group that forms a silanol group by hydrolysis in the molecule.

1. Polymerizable Unsaturated Group

There are no specific limitations to the polymerizable unsaturated group contained in the organic compound. An acryloyl group, methacryloyl group, vinyl group, propenyl group, butadienyl group, styryl group, ethynyl group, cinnamoyl group, maleate group, and acrylamide group, can be given as suitable examples.

This polymerizable unsaturated group is a structural unit to effect an addition polymerization by active radicals.

2. The Group Shown by the Above Formula (1)

There are 6 types for the group [—X—C (=Y)—NH—] of the formula (1) contained in the specific organic compound, specifically, they are [—O—C(=O)—NH—], [—O—C(=S)—NH—], [—S—C(=O)—NH—], [—NH—C(=O)—NH—], [—NH—C(=S)—NH—], and [—S—C(=S)—NH—]. These groups may be used either individually or in combinations of two or more. Among these, the combined use of the group [—O—C(=O)—NH—] and either one of the groups [—O—C(=S)—NH—] and [—S—C(=O)—NH—] is preferable from the viewpoint of ensuring excellent heat stability.

The above-mentioned group [—X—C (=Y)—NH—] of the formula (1) is considered to generate a moderate cohesive force by a hydrogen bond among molecules, which provides the cured product with characteristics such as superior mechanical strength, excellent adhesion properties to substrates, and good heat resistance.

3. Silanol Group or a Group that Forms a Silanol Group by Hydrolysis

The organic compound is preferably a compound having a silanol group (hereinafter may be called "silanol group-containing compound") or a compound that forms a silanol group by hydrolysis (hereinafter may be called "silanol group-forming compound"). As a silanol group-forming compound, a compound having an alkoxy group, aryloxy group, acetoxy group, amino group, halogen group, or the like on a silicon atom can be given, with a compound including an alkoxy group or aryloxy group on a silicon atom, specifically, an alkoxysilyl group-containing compound or an aryloxysilyl group-containing compound being preferable.

The silanol group or the silanol group-forming site of the silanol group-forming compound is the structural unit that bonds with the oxide particles by a condensation reaction or the condensation reaction after hydrolysis.

4. Preferable Embodiment

The compounds shown by the following formula (2) can be given as examples of preferable organic compounds,

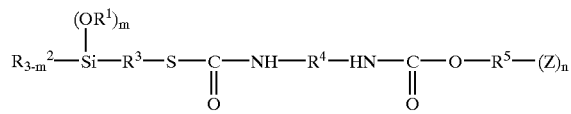

(2)

wherein $R^1$ and $R^2$ individually represent a hydrogen atom or an alkyl group or aryl group having 1–8 carbon atoms such as a methyl group, ethyl group, propyl group, butyl group, octyl group, phenyl group, xylyl group, and the like and wherein m is an integer of 1–3.

As examples of the group represented by $[(R^1O)_m R^2_{3-m}Si—]$, trimethoxysilyl group, triethoxysilyl group, triphenoxysilyl group, methyldimethoxysilyl group, dimethylmethoxysilyl group, and the like can be given. Of these groups, trimethoxysilyl group, triethoxysilyl group, and the like are desirable.

$R^3$ is a divalent organic group having a $C_1$–$C_{12}$ aliphatic or aromatic structure that may include a linear, branched, or cyclic structure. A methylene, ethylene, propylene, butylene, hexamethylene, cyclohexylene, phenylene, xylylene, dodecamethylene, and the like can be given as such organic groups. Of these, preferable groups are methylene, propylene, cyclohexylene, phenylene, and the like.

$R^4$ is a divalent organic group and usually selected from the divalent organic groups having a molecular weight from 14 to 10,000, and preferably from 76 to 500. For example, a linear polyalkylene group such as hexamethylene, octamethylene, and dodecamethylene; an alicyclic or polycyclic divalent organic group such as cyclohexylene and norbornylene; a divalent aromatic group such as phenylene, naphthylene, biphenylene, and polyphenylene; and an alkyl group or aryl group substitution product of these groups can be given. Moreover, these divalent organic groups may include group having an element other than a carbon atom and hydrogen atom, and may further include an ether bond, ester bond, amide bond, carbonate bond, and the group shown by the above-mentioned formula (1).

$R^5$ is an organic group of a (n+1) valence and preferably selected from the group consisting of linear, branched, or cyclic, saturated or unsaturated hydrocarbon groups.

Z is a monovalent organic group having a polymerizable unsaturated group in the molecule that causes an intermolecular crosslinking reaction in the presence of reactive radicals. For example, an acryloyl(oxy) group, methacryloyl (oxy) group, vinyl(oxy) group, propenyl(oxy) group, butadienyl(oxy) group, styryl(oxy) group, ethynyl(oxy) group, cinnamoyl(oxy) group, maleate group, acrylamide group, methacrylamide group, and the like can be given. Among these, an acryloyl(oxy) group and methacryloyl (oxy) group are desirable. Moreover, n is an integer preferably from 1 to 20, and more preferably from 1 to 10, and most preferably from 1 to 5.

The organic compound used in the present invention can be synthesized by a method described in Japanese Patent Application Laid-open No. 100111/1997, for example. Specifically, (a) a method comprising an addition reaction of a mercaptoalkoxysilane, a polyisocyanate compound, and an active hydrogen group-containing polymerizable unsaturated compound can be used. Another method (b) comprises a direct reaction of a compound having both an alkoxy silyl group and an isocyanate group in the molecule with an active hydrogen-containing polymerizable unsaturated compound. Still another method (c) comprises an addition reaction of a compound having both a polymerizable unsaturated group and an isocyanate group in the molecule with a mercapto alkoxysilane compound or aminosilane compound.

Among these methods, the method (a) is preferably used to synthesize the compound shown by the above-mentioned formula (2).

More specifically, for example, there is a method (a-1) which comprises causing mercaptoalkoxysilane and a polyisocyanate compound to react to produce an intermediate compound having an alkoxy silyl group, a group [—S—C(=O)NH—], and an isocyanate group in the molecule, then causing a hydroxyl group-containing polymerizable unsaturated compound to react with the isocyanate group which is present in the intermediate compound, thereby combining this unsaturated compound via the group [—S—C(=O)NH—]. Another method (a-2) comprises forming an intermediate compound having a polymerizable unsaturated group, a group [—O—C(=O)—NH—] and an isocyanate group in the molecule by reacting a polyisocyanate compound and a hydroxyl group-containing polymerizable unsaturated compound to, and then combining the mercaptoalkoxysilane via the group [—S—C(=O)—NH—] by reacting the intermediate compound with mercaptoalkoxysilane.

Among the two methods, the method (a-1) is preferred because this method exhibits no decrease in the polymerizable unsaturated group due to the Michael addition reaction.

In the synthesis of the compound shown by the abovementioned formula (2), a compound having at least one alkoxysilyl group and at least one mercapto group in the molecule can be given as an example of the alkoxysilane which can form the group [—S—C(=O)—NH—] by the reaction with an isocyanate group. As such a mercaptoalkoxysilane, for example, mercaptopropyltrimethoxysilane, mercaptopropyltriethoxysilane, mercaptopropylmethyldiethoxysilane, mercaptopropyldimethoxymethylsilane, mercaptopropylmethoxydimethylsilane, mercaptopropyltriphenoxysilane, mercaptopropyltributoxysilane, and the like can be given.

Among these, mercaptopropyltrimethoxysilane and mercaptopropyltriethoxysilane are desirable. Moreover, an addition compound of an amino-substituted alkoxysilane to an epoxy group-substituted mercaptan and an addition compound of α,ω-dimercapto compound to an epoxysilane can also be used.

The polyisocyanate compound used for synthesizing the organic compound can be selected from polyisocyanate compounds of a chain-like saturated hydrocarbon, cyclic saturated hydrocarbon, or aromatic hydrocarbons.

As examples of such a polyisocyanate compound, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethyl phenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl)fumarate, 6-isopropyl-1,3-phenyl diisocyanate, 4-diphenylpropane diisocyanate, lysine diisocyanate, hydrogenated diphenylmethane diisocyanate, 1,3-bis(isocyanatemethyl) cyclohexane, tetramethyl xylylene diisocyanate, and 2,5 (or 6)-bis(isocyanatemethyl) bicyclo[2.2.1]heptane can be given. Among these, 2,4-tolylene diisocyanate, isophorone diisocyanate, xylylene diisocyanate, methylenebis(4-cyclohexylisocyanate), 1,3-bis(isocyanatemethyl)cyclohexane, and the like are desirable. These compounds may be used either individually or in combination of two or more.

As examples of the active hydrogen-containing polymerizable unsaturated compound which can be bonded through the group [—O—C(=O)—NH—] by the addition reaction of the above-mentioned polyisocyanate compound used in the synthesis of the organic compound, compounds having at least one active hydrogen atom which can form the group [—O—C(=O)—NH—] by the addition reaction with an isocyanate group and at least one polymerizable unsaturated group in the molecule can be given.

Given as examples of such active hydrogen-containing polymerizable unsaturated compounds are 2-hydroxyethyl (meth)acrylate, 2-hydroxypropyl (meth)acrylate, 2-hydroxybutyl (meth)acrylate, 2-hydroxy-3-phenyloxypropyl (meth)acrylate, 1,4-butanediol mono(meth)acrylate, 2-hydroxyalkyl (meth)acryloyl phosphate, 4-hydroxycyclohexyl (meth)acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, and dipentaerythritol penta(meth)acrylate. In addition, compounds obtained by the addition reaction of a glycidyl group-containing compound such as alkyl glycidyl ether, allyl glycidyl ether, or glycidyl (meth)acrylate with (meth) acrylic acid can also be used. Of these compounds, 2-hydroxyethyl (meth)acrylate, 2-hydroxypropyl (meth) acrylate, pentaerythritol tri(meth)acrylate, and the like are desirable.

These compounds may be used either individually or in combinations of two or more.

(3) Preparation of Crosslinkable Particles (A)

Although there are no specific limitations to the method for preparing the crosslinkable particles (A) used in the present invention, a method of reacting the organic compound and the oxide particles can be given as an example. The oxide particles are known to include moisture on the surface of particles as adsorbed water under usual storage conditions. In addition, components which react with the silanol group-forming compound such as a hydroxide, hydrate, or the like are presumed to be present at least on the surface of the oxide particles. Therefore, the crosslinkable particles (A) can be prepared by mixing the silanol group-forming compound and oxide particles, and heating the mixture while stirring. It is desirable that the reaction be carried out in the presence of water to efficiently bind the silanol group-forming site possessed by the organic compound and the oxide particles. However, water may not be present when the organic compound possesses a silanol group. Therefore, the crosslinkable particles (A) is prepared by a method which includes at least the operation of blending the oxide particles and the organic compound.

The amount of the organic compound bonded to the oxide particles is preferably 0.01 wt % or more, more preferably 0.1 wt % or more, and particularly preferably 1 wt % or more, for 100 wt % of the crosslinkable particles (A) (the total of the oxide particles and the specific organic compound). If the amount of the organic compound bonded to the oxide particles is less than 0.01 wt %, the crosslinkable particles (A) exhibit only inadequate dispersibility in the composition, which may result in cured products with insufficient transparency and scratch resistance. Moreover, the ratio of oxide particles in the raw materials in the preparation of the crosslinkable particles (A) is preferably 5–99 wt %, and more preferably 10–98 wt %.

The method of preparing the crosslinkable particles (A) will now be described in more detail taking the alkoxysilyl group-containing compound (alkoxysilane compound) shown by the above formula (2) as an example of the silanol group-forming compound.

The amount of water consumed in the hydrolysis of the alkoxysilane compound in the preparation of the crosslinkable particles (A) may be the amount to hydrolyze at least one alkoxy group on the silicon atoms in the molecule. Preferably, the amount of water which is added or present during the hydrolysis reaction is one third (⅓) or more of the number of mols of the total alkoxy groups on the silicon atoms, with particularly preferable amount being from ½ to 3 times of the number of mols of the total alkoxy groups. The product obtained by blending the alkoxysilane compound and oxide particles under the condition where no water is present at all is a product in which the alkoxysilane compound is physically adsorbed on the surface of oxide particles. Only poor hardness and scratch resistance effect can be exhibited by the cured product obtained from the composition comprising such crosslinkable particles (A).

The methods which can be selected for the preparation of crosslinkable particles (A) include a method of separately hydrolyzing the above-mentioned alkoxysilane compound, and mixing the hydrolyzed product with a powder of oxide particles or a solvent dispersion sol of oxide particles with heating and stirring; a method of carrying out the hydrolysis of the alkoxysilane compound in the presence of the oxide particles; and a method of treating the surface of the oxide particles in the presence of, for example, (D) the polymerization initiator and the like. Among these, the method of hydrolyzing the alkoxysilane compound in the presence of oxide particles is desirable. The treatment for the preparation of the crosslinkable particles (A) is carried out at a temperature from 0° C. to 150° C., and preferably from 20° C. to 100° C. The treating time is usually from 5 minutes to 24 hours.

When oxide particles in the form of a powder is used in the preparation of the crosslinkable particles (A), an organic solvent may be added to ensure a smooth and homogeneous reaction with the alkoxysilane compound. The same solvents as used as the above-mentioned dispersion medium for the oxide particle sol can be used as such organic solvents. There are no specific limitations to the types of these solvents, inasmuch as a smooth and homogeneous reaction is ensured.

When a solvent dispersion sol is used as the raw material for the crosslinkable particles (A), the crosslinkable particles (A) can be prepared by a process comprising at least a step of mixing the solvent dispersion sol and the organic compound. Here, an organic solvent which is mutually soluble with water can be added to ensure homogeneity in the initial stage of the reaction and smooth reaction.

Moreover, an acid, salt, or base may be added as a catalyst to accelerate the reaction to produce the crosslinkable particles (A). Given as examples of the acid are inorganic acids such as hydrochloric acid, nitric acid, sulfuric acid, and phosphoric acid, organic acids such as methanesulfonic acid, toluenesulfonic acid, phthalic acid, malonic acid, formic acid, acetic acid, and oxalic acid, as well as unsaturated organic acids such as methacrylic acid, acrylic acid, and itaconic acid. As examples of the salt, ammonium salts such as tetramethylammonium chloride and tetrabutylammonium chloride can be given. Given as examples of the base, aqueous ammonia; primary, secondary, or tertiary aliphatic amines such as diethylamine, triethylamine, dibutylamine, and cyclohexylamine; aromatic amines such as pyridine; sodium hydroxide, potassium hydroxide; as well as quaternary ammonium hydroxides such as tetramethylammonium hydroxide, tetrabutylammonium hydroxide, and the like.

Among these, preferable catalysts are acids such as organic acids and unsaturated organic acids, and bases such as tertiary amines and quaternary ammonium hydroxide. The amount of these acids, salts, or bases to be added is preferably from 0.001 to 1.0 part by weight, and more preferably from 0.01 to 0.1 part by weight, for 100 parts by weight of the alkoxysilane compounds.

Preferably, a dehydrating agent is added to promote the reaction.

As a dehydrating agent, inorganic compounds such as zeolite, anhydrous silica, and anhydrous alumina, and organic compounds such as methyl orthoformate, ethyl orthoformate, tetraethoxymethane, and tetrabutoxymethane can be used. Of these, the organic compounds are preferred, with ortho esters such as methyl orthoformate and ethyl orthoformate being particular preferred.

The amount of the alkoxysilane compound bonded with the crosslinkable particles (A) can be determined as a weight loss (%) when a dry powder is burnt completely in air in a thermogravimetric analysis at a temperature from 110° C. to 800° C.

The amount of crosslinkable particles (A) incorporated in the resin composition is from 5–90 wt %, and preferably from 10–70 wt %, for 100 wt % of the composition (the total of the crosslinkable particles (A) and compound (C)). If less than 5 wt %, hardness of the cured products may be insufficient; if more than 90 wt %, there may be the occasion where coatings are not cured and no coating films can be produced. The amount of the crosslinkable particles (A) here means the amount of the solid components and does not include the amount of solvents when the crosslinkable particles (A) are used in the form of a solvent dispersion sol.

2. Oligomer-type Radiation Polymerization Initiator

The oligomer-type radiation polymerization initiator (B) used in the present invention is a compound having a site which generates photo-radicals (active radicals) by irradiation of radioactive rays and having a recurring unit which is a divalent organic group shown by the above formula (3). The oligomer-type radiation polymerization initiator (B) is used for improving balance between the hardness and low curling properties of the coatings made from the composition of the present invention.

There are no specific limitations to the oligomer-type radiation polymerization initiator (B) inasmuch as the oligomer has a site which produces photo-radicals by irradiation of radioactive rays. An example of preferably oligomers are those having a weight average molecular weight of 400 to 10,000. If less than 400, low curling properties may be inadequate; if more than 10,000, the hardness may be insufficient.

Preferably the oligomer-type radiation polymerization initiator (B) is an oligo(2-hydroxy-2-methyl-1-(4-(1-methylvinyl)phenyl)propanone) of the following formula (4),

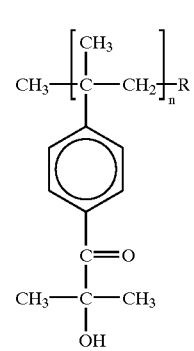

(4)

wherein R is a mono-valent group, preferably an organic mono-valent group, and n is an integer from 2 to 45.

A polymerization initiator (D) other than the oligomer-type radiation polymerization initiator (B) may be added to the composition of the present invention, as required.

As examples of the polymerization initiator (D) other than the oligomer-type radiation polymerization initiator (B), a compound generating active radicals (photo-radicals) by irradiation of radioactive rays (radiation polymerization initiator) and a compound thermally generating active radicals (heat polymerization initiator) can be given.

There are no specific limitation to the radiation polymerization initiator other than the oligomer-type radiation polymerization initiator (B) inasmuch as such an initiator can generate radicals by irradiation of light and initiate polymerization. Examples of such intiators include acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy) phenyl-(2-hydroxy-2-propyl)ketone, 2,4,6-trimethylbenzoyl diphenylphosphine oxide, and bis-(2,6-dimethoxybenzoyl)-2,4,4-trimethylpentylphosphine oxide.

As examples of commercially available products of the photopolymerization initiator, Irgacure184, 369, 651, 500, 819, 907, 784, 2959, CGI1700, CGI1750, CGI1850, CG24-61, Darocur 1116, 1173 (manufactured by Ciba Specialty Chemicals Co., Ltd.), Lucirin TPO, LR8893 (manufactured by BASF), Ubecryl P36 (manufactured by UCB), and the like can be given.

A heat-polymerization initiator can be optionally added when curing the resin composition of the present invention. Peroxides and azo compounds can be given as examples of preferable heat-polymerization initiators.

Specific examples include benzoyl peroxide, t-butyl peroxybenzoate, azobisisobutyronitrile, and the like.

The amount of the oligomer-type radiation polymerization initiator (B) used in the composition of the present invention is from 0.01–20 parts by weight, and preferably from 0.1–10 parts by weight, for 100 parts by weight of the composition (the total of the crosslinkable particles (A) and the compound (B)). If less than 0.01 part by weight, curing may be inadequate; if more than 20 parts by weight, the hardness may be insufficient.

Both the oligomer-type radiation polymerization initiator (B) which is supplied as a single compound and supplied as a mixture with another photoinitiator or an acrylic monomer can be used.

Given as examples commercially available products of the oligo(2-hydroxy-2-methyl-1-(4-(1-methylvinyl)phenyl) propanone shown by the above formula (3) are Ezacure KIP 150 (CAS-NO. 163702-01-0, n=4 to 6), KIP65LT (a mixture of KIP 150 and tripropylene glycol diacrylate), KIP 100F (a mixture of KIP 150 and 2-hydroxy-2-methyl-1-phenylpropan-1-one), KT37, KT55 (both a mixture of KIP 150 and methyl benzophenone derivatives), KTO46 (a mixture of KIP 150, methyl benzophenone derivative, and 2,4,6-trimethylbenzoyl diphenylphosphine oxide), KIP75/B (a mixture of KIP 150 and 2,2-dimethoxy-1,2-diphenylethan-1-one), and the like.

3. Compound (C)

The compound (C) which is used in the present invention is a compound having two or more polymerizable unsaturated groups in the molecule. The compound (C) is preferably used to increase film-forming capability of the composition. Although there are no specific limitations to the types of compound (C) so long as the compound has two or more polymerizable unsaturated groups, (meth)acrylic esters and vinyl compounds can be given as examples. Of these, (meth)acrylic esters are preferred.

The following compounds can be given as specific examples of the compound (C) used in the present invention.

Given as examples of (meth)acrylic esters are trimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, dipentaerythritol hexa(meth)acrylate, glycerol tri(meth)acrylate, tris(2-hydroxyethyl) isocyanurate tri(meth)acrylate, ethylene glycol di(meth)acrylate, 1,3-butanediol di(meth)acrylate, 1,4-butanediol di(meth) acrylate, 1,6-hexanediol di(meth)acrylate, neopentyl glycol di(meth)acrylate, diethylene glycol di(meth)acrylate, triethylene glycol di(meth)acrylate, dipropylene glycol di(meth) acrylate, and bis(2-hydroxyethyl) isocyanurate di(meth) acrylate; as well as ethylene oxide or propylene oxide addition poly(meth)acrylates to these (meth)acrylates, oligoester (meth)acrylates, oligoether (meth)acrylates, oligourethane (meth)acrylates,and oligoepoxy (meth)acrylates having two or more (meth)acryloyl groups in the molecule, and the like. Among these, dipentaerythritol hexa(meth) acrylate, dipentaerythritol penta(meth)acrylate, pentaerythritol tetra(meth)acrylate, and ditrimethylolpropane tetra (meth)acrylate are desirable.

As vinyl compounds, divinylbenzene, ethylene glycol divinyl ether, diethylene glycol divinyl ether, triethylene glycol divinyl ether, and the like can be given.

Given as examples of commercially available products of the compound (C) are the products commercially avail under the trade names Aronix M-400, M-408, M-450, M-305, M-309, M-310, M-315, M-320, M-350, M-360, M-208, M-210, M-215, M-220, M-225, M-233, M-240, M-245, M-260, M-270, M-1100, M-1200, M-1210, M-1310, M-1600, M-221, M-203, TO-924, TO-1270, TO-1231, TO-595, TO-756, TO-1231, TO-1343, TO-902, TO-904, TO-905, and TO-1330 (manufactured by Toagosei Co., Ltd.); KAYARAD D-310, D-330, DPHA, DPCA-20, DPCA-30, DPCA-60, DPCA-120, DN-0075, DN-2475, SR-295, SR-355, SR-399E, SR-494, SR-9041, SR-368, SR-415, SR-444, SR-454, SR-492, SR-499, SR-502, SR-9020, SR-9035, SR-111, SR-212, SR-213, SR-230, SR-259, SR-268, SR-272, SR-344, SR-349, SR-601, SR-602, SR-610, SR-9003, PET-30, T-1420, GPO-303, TC-120S, HDDA, NPGDA, TPGDA, PEG400DA, MANDA, HX-220, HX-620, R-551, R-712, R-167, R-526, R-551, R-712, R-604, R-684, TMPTA, THE-330, TPA-320, TPA-330, KS-HDDA, KS-TPGDA, to KS-TMPTA (manufactured by Nippon Kayaku Co., Ltd.); and Light Acrylate PE-4A, DPE-6A, DTMP-4A (manufactured by Kyoeisha Chemical Co., Ltd.); and the like.

The amount of the compound (C) used in the present invention is preferably from 10–95 wt %, and more preferably from 30–90 wt %, for 100 wt % of the composition (the total the crosslinkable particles (A) and the compound (C)). If less than 10 wt %, hardness of the cured products is insufficient; if more than 95 wt %, a low curing properties in the cured products may be insufficient.

As required, a compound having one polymerizable unsaturated group in the molecule may be used in the composition of the present invention in addition to the compound (C).

4. Components Other than the Above Components

Various components such as photosensitizers, and oxide particles other than the crosslinkable particles (A) can be incorporated in the composition of the present invention as required. Specific examples are given below.

(1) Photosensitizers

As photosensitizers, for example, triethylamine, diethylamine, N-methyldiethanoleamine, ethanolamine, 4-dimethylaminobenzoic acid, methyl 4-dimethylaminobenzoate, ethyl 4-dimethylaminobenzoate, isoamyl 4-dimethylaminobenzoate, and the like can be given. As commercially available products of photosensitizers, KAYACURE DMBI, EPA (manufactured by Nippon Kayaku Co., Ltd.), and the like can be given.

(2) Oxide Particles Other than the Crosslinkable Particles (A)

Oxide particles which are not bonded with an organic compound having a polymerizable unsaturated group, for example, can be given as oxide particles other than the crosslinkable particles (A).

(3) Various Other Additives

As additives, for example, antioxidants, UV absorbers, light stabilizers, silane coupling agents, aging preventives, thermal polymerization inhibitors, coloring agents, leveling agents, surfactants, preservatives, plasticizers, lubricants, inorganic fillers, organic fillers, wettability improvers, coating surface improvers, and the like can be given.

As commercially available products of antioxidants, Irganox 1010, 1035, 1076, 1222 (manufactured by Ciba Specialty Chemicals Co., Ltd.), and the like can be given; as commercially available products of UV absorbers, Tinuvin P, 234, 320, 326, 327, 328, 213, 400 (manufactured by Ciba Specialty Chemicals Co., Ltd.), Sumisorb 110, 130, 140, 220, 250, 300, 320, 340, 350, 400 (manufactured by Sumitomo Chemical Industries Co., Ltd.), and the like can be given; as commercially available products of light stabilizers, Tinuvin 292, 144, 622LD (manufactured by Ciba Specialty Chemicals Co., Ltd.), Sanol LS-770, 765, 292, 2626, 1114, 744 (manufactured by Sankyo Chemical Co.), and the like can be given; as examples of silane coupling agents, γ-aminopropyltriethoxysilane, γ-mercaptopropyltrimethoxysilane, 7-methacryloxypropyltrimethoxysilane, and the like can be given; as commercially available products of these silane coupling agents, SH6062, SZ6030 (manufactured by Toray-Dow Corning Silicone Co., Ltd.), KBE903, KBM803 (manufactured by a Shin-Etsu Silicone Co., Ltd.), and the like can be given; and as commercially available products of aging preventives, Antigene W, S, P, 3C, 6C, RD-G, FR, AW (manufactured by Sumitomo Chemical Industries Co., Ltd.), and the like can be given.

(4) Additives Other than Above-mentioned Additives

Given as additives other than those mentioned above are polymers, oligomers, and the like, for example, epoxy resins, polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resins, xylene resin, ketone resin, fluorine-containing oligomer, silicon-containing oligomer, and polysulfide-type oligomer.

The composition of the present invention is suitable as a coating material. Plastics (polycarbonate, polymethacrylate, polystyrene, polyester, polyolefin, epoxy, melamine, triacetyl cellulose, ABS, acrylonitrile-styrene resin, norbornene resin, etc.), metals, woods, papers, glass, slates, and the like can be given as examples of the substrates to which the composition is coated. These substrates may be either in the shape of a film or a formed three-dimensional object. Conventional coating methods such as dipping, spray coating, flow coating, shower coating, roll coating, brush coating, and the like can be given as coating methods. The thickness of coating films after cure and drying is usually from 0.1 to 400 $\mu$m, and preferably from 1 to 200 $\mu$m.

To adjust the coating film thickness, the composition of the present invention can be used by diluting with a solvent. When used as a coating material, for example, the viscosity of the composition is usually from 0.1 to 50,000 mPa·s/25° C., and preferably from 0.5 to 10,000 mPa·s/25° C.

5. Method of Curing the Composition

The composition of the present invention is cured by heat and/or radioactive rays.

When the composition is cured by heat, an electric heater, infrared ray lamp, hot blast, and the like can be used as the heat source.

When radioactive rays are used, there are no specific limitations to the source of the radioactive rays so long as the composition can be cured in a short period of time after coating. As examples of the source of infrared rays, a lamp, resistance heating plate, laser, and the like can be given. As examples of the source of visible rays, sunlight, a lamp, fluorescent lamp, laser, and the like can be given. As the source of ultraviolet rays, a mercury lamp, halide lamp, laser, and the like can be given. As examples of the source of electron beams, a system of utilizing thermoelectrons produced by a commercially available tungsten filament, a cold cathode method generating electron beams by passing a high voltage pulse through a metal, and a secondary electron method which utilizes secondary electrons produced by collision of ionized gaseous molecules and a metal electrode can be given. As the source of $\alpha$-rays, $\beta$-rays, and $\gamma$-rays, for example, fissionable materials such as $Co^{60}$ and the like can be given. These radioactive rays can be used either individually or in combinations of two or more. In the latter case, the two or radioactive rays may be used either simultaneously or with a certain intervals.

II. Cured Products

The cured products of the present invention can be obtained by applying the composition onto a plastic substrates, for example, and curing the coating. Specifically, such a cured product can be obtained as a coated form by applying the composition onto an object, drying the coating by removing volatile components at a temperature preferably from 0 to 200° C., and curing the coating by heat and/or radioactive rays. Curing by heat is preferably performed under the conditions from 20 to 150° C. for 10 seconds to 24 hours. When the coating is cured by radioactive rays, use of ultraviolet rays and electron beams are preferable. Ultraviolet rays are irradiated at a dose preferably from 0.01–10 J/cm$^2$, and more preferably from 0.1 to 2 J/cm$^2$. Electron beams are irradiated under the conditions of 10–300 KV, an electron density of 0.02–0.30 mA/cm$^2$, and at a dose from 1–10 Mrad.

Because the cured products of the present invention possess excellent hardness, superior scratch resistance, low curling properties, and superb adhesion, particularly well balanced hardness and low curling properties, the products are suitable for use as a protective coating material to prevent stains or scratches on plastic optical parts, touch panels, film-type liquid crystal elements, plastic containers, or flooring materials, wall materials, and artificial marbles which are used for architectural interior finish; as an adhesive for various substrates, a sealing material, and a vehicle for printing ink; and the like.

EXAMPLES

The present invention will be explained in more detail by examples, which are not intended to be limiting of the present invention. In the description below, "parts" and "%" respectively mean "parts by weight" and "wt %", unless otherwise indicated.

The words "solid content" in the present invention means the content of components excluding volatile components such as solvents from the composition in the present invention, specifically, "solid content" means the content of a residue (nonvolatile components) obtained by drying the composition for one hour on a hot plate at 120° C.

Synthesis of Organic Compounds

Synthetic Example 1

20.6 parts of isophorone diisocyanate was added to a solution of 7.8 parts of mercaptopropyltrimethoxysilane and 0.2 part of dibutyl tin dilaurate in dry air in one hour while stirring at 50° C. The mixture was stirred for a further three hours at 60° C. After the addition of 71.4 parts of pentaerythritol triacrylate dropwise in one hour at 30° C., the mixture was stirred for a further three hours at 60° C. with heating to obtain an organic compound (S1). An infrared absorption spectrum of the product showed that the absorption peaks at 2550 cm$^{-1}$ characteristic to a mercapto group and at 2260 cm$^{-1}$ characteristic to an isocyanate group in the raw material have disappeared, and the absorption peaks at 1660 cm$^{-1}$ characteristic to [—O—C(=O)—NH—] group and [—S—C(=O)—NH—] group and at 1720 cm$^{-1}$ characteristic to an acryloyl group have emerged, indicating production of an organic compound (specific organic compound) having an acryloyl group, [—O—C(=O)—NH—] group, and [—S—C(=O)—NH—] group as polymerizable unsaturated groups.

Synthetic Example 2

38.7 parts of 1,3-bis(isocyanatemethyl)cyclohexane was added to a solution of 38.4 parts of mercaptopropyltrimethoxysilane and 0.2 part of dibutyl tin dilaurate in dry air in one hour while stirring at 50° C. The mixture was stirred for a further three hours at 70° C. After the addition of 22.7 parts of 2-hydroxyethyl acrylate dropwise in one hour at 30° C., the mixture was stirred for a further ten hours at 60° C.

with heating to obtain an organic compound (S2). The amount of isocyanate remaining in the product was analyzed to find that the remaining amount was 0.1% or less, indicating that the reaction was completed almost quantitatively.

Preparation of Crosslinkable Particles (A)

Examples for preparing crosslinkable particles (A) are shown in Preparation Examples 1 to 4. The results are summarized in Table 1.

Preparation Example 1

A mixture of 8.7 parts of the organic compound (S1) synthesized in Synthetic Example 1, 91.3 parts of methyl ethyl ketone silica sol (MEK-ST, manufactured by Nissan Chemical Industries, Ltd., the number average particle diameter: 0.022 µm, silica concentration: 30%), 0.2 part of iso-propanol, and 0.1 part of ion exchange water was stirred at 80° C. for 3 hours in a dried air stream, followed by the addition of 1.4 parts of methyl orthoformate. The mixture was stirred for a further one hour while heating at the same temperature, to obtain a colorless transparent dispersion liquid of crosslinkable particles (A) (Dispersion Liquid "a"). 2 g of the Dispersion Liquid "a" was weighed on an aluminum dish and dried for one hour on a hot plate at 120° C. The dried material was weighed to indicate that the solid content was 35%.

Preparation Example 2

A mixture of 8.3 parts of the organic compound (S2) synthesized in Synthetic Example 2, 91.7 parts of methyl ethyl ketone silica sol (MEK-ST), and 0.8 part of ion exchanged water was stirred at 80° C. for 3 hours in a dried air stream, followed by the addition of 4.9 parts of methyl orthoformate. The mixture was stirred for a further one hour while heating at the same temperature (80° C.) to obtain a semitransparent dispersion liquid of crosslinkable particles (A) (Dispersion Liquid "b"). The solid content of the Dispersion Liquid "b" was measured in the same manner as in Preparation Example 1 to indicate that the solid content was 34%.

Preparation Example 3

A mixture of 4.8 parts of the organic compound (S1) synthesized in Synthesis Example 1, 95.2 parts of isopropanol alumina sol (trade name: AS-150I, the number average particle diameter: 0.013 µm, alumina concentration: 15%, manufactured by Sumitomo Osaka Cement Co., Ltd.), 0.01 part of p-methoxyphenol, and 1.0 part of ion-exchanged water was stirred for 3 hours at 60° C. After the addition of 1.0 part of methyl orthoformate, the mixture was stirred for a further one hour to obtain a dispersion liquid of crosslinkable particles (A) (Dispersion Liquid "c"). The solid content of the Dispersion Liquid "c" was measured in the sama manner as in Preparation Example 1 to indicate that the solid content was 19%.

Preparation Example 4

A mixture of 8.2 parts of the organic compound (S1) prepared in Synthetic Example 1, 91.8 parts of toluene zirconium oxide sol (the number average particle diameter: 0.01 µm, zirconium oxide concentration: 30%), and 0.1 part of ion exchanged water was stirred at 60° C. for 3 hours, followed by the addition of 1.3 parts of methyl orthoformate and 41.2 parts methyl ethyl ketone. The mixture was stirred for a further one hour while heating at the same temperature to obtain a dispersion liquid of crosslinkable particles (A) (Dispersion Liquid "d"). The solid content of the Dispersion Liquid "d" was measured in the sama manner as in Preparation Example 1 to indicate that the solid content was 25%.

TABLE 1

|  | Preparation Example | | | |
|---|---|---|---|---|
|  | 1 | 2 | 3 | 4 |
| Dispersion Liquid of crosslinkable particles (A) | a | b | c | d |
| Organic compound |  |  |  |  |
| S1 | 8.7 |  | 4.8 | 8.2 |
| S2 |  | 8.3 |  |  |
| Oxide particle sol |  |  |  |  |
| P1 | 91.3 | 91.7 |  |  |
| P2 |  |  | 95.2 |  |
| P3 |  |  |  | 91.8 |
| Ion-exchanged water | 0.1 | 0.8 | 0.1 | 0.1 |
| Isopropanol | 0.2 |  |  |  |
| Methyl ethyl ketone |  |  |  | 41.2 |
| Methyl orthoformate | 1.4 | 4.9 | 1.0 | 1.3 |
| p-Methoxyphenol |  |  | 0.01 |  |
| Solid components (%) | 35 | 34 | 19 | 25 |
| Oxide particles in raw materials (%) | 76 | 77 | 72 | 77 |

P1: Methyl ethyl ketone silica sol (Oxide particle concentration: 30%)
P2: Isopropanol alumina sol (Oxide particle concentration: 15%)
P3: Toluene zirconium oxide sol (Oxide particle concentration: 30%)

Examples for the Preparation of Compositions

Examples for the preparation of the composition of the present invention are shown in Examples 1–4 and Comparative Examples 1–3. The weight ratio of the components for the compositions are shown in Table 2.

Example 1

151 parts of Dispersion Liquid "a" prepared in the Preparation Example 1 (the crosslinkable particles: 53 parts, dispersion medium: methyl ethyl ketone (MEK)), 23.5 parts of dipentaerythritol hexacrylate, and 23.5 parts of pentaerythritol tetracrylate were mixed in a 500 cc eggplant flask. The mixture was concentrated using a rotary evaporator under reduced pressure to a volume of 131 parts. 122 parts of methyl isobutyl ketone (MIBK) and 4 parts of oligo(2-hydroxy-2-methyl-1-(4-(1-methylvinyl)phenyl) propanone) were added, and the mixture was stirred for two hours at 50° C. to obtain a composition in the form of a homogeneous solution. The preparation was carried out in a room shielded from ultraviolet rays. The solid content of the composition was determined in the same manner as in Preparation Example 1, to find that the solid content was 40%.

Example 2

151 parts of the dispersion liquid of Dispersion Liquid "b" prepared in the Preparation Example 2 (the crosslinkable particles: 53 parts, dispersion medium: methyl ethyl ketone (MEK)), 23.5 parts of dipentaerythritol hexacrylate, 23.5 parts of pentaerythritol hexacrylate, 55 parts of cyclohexanone, 4.5 parts of oligo(2-hydroxy-2-methyl-1-(4-(1-methylvinyl)phenyl)propanon) were blended by stirring for two hours in a dry air stream in a container shielded from ultraviolet rays at 50° C., to obtain a composition in the form of a homogeneous solution. The solid content of the composition was determined in the same manner as in Preparation Example 1, to find that the solid content was 40%.

Examples 3 and 4

Compositions of Examples 3 and 4 were prepared in the same manner as in Example 2, except for using the components shown in Table 2.

Comparative Examples 1 and 2

Compositions of Comparative Examples 1 and 2 were prepared in the same manner as in Example 1 except for using the components shown in Table 2.

Comparative Example 3

Compositions of Comparative Example 3 was prepared in the same manner as in Example 2 except for using the components shown in Table 2.

1. Coating, Drying, and Curing Conditions

In Examples 1–4 and Comparative Examples 1–3 in Table 2, the compositions were applied to substrates using a bar coater so as to produce dry films with a thickness of 10 μm, dried in a hot blast oven at 80° C. for 3 minutes, irradiated at a dose of 1 J/cm$^2$ using a conveyer-type mercury lamp, and stored at 25° C. for 24 hours before the evaluation.

2. Substrates

Glass plates were used for the pencil hardness test, polyethylene terephthalate (PET) films with a thickness of 188 μm were used for the steel wool scratch resistance test and the evaluation of adhesion, and PET films with a thickness of 100 μm were used for the evaluation of curling properties.

3. Evaluation Method

Pencil Hardness:

TABLE 2

|  | Example | | | | Comparative Example | | |
|---|---|---|---|---|---|---|---|
|  | 1 | 2 | 3 | 4 | 1 | 2 | 3 |
| Crosslinkable particles (A)] | | | | | | | |
| Particles in Dispersion Liquid a | 53 | | | | 53 | 53 | |
| Particles in Dispersion Liquid b | | 53 | | | | | 53 |
| Particles in Dispersion Liquid c | | | 53 | | | | |
| Particles in Dispersion Liquid d | | | | 78 | | | |
| Compound with polymerizable unsaturated groups (C) | | | | | | | |
| M1 | 23.5 | 23.5 | 23.5 | 13 | 23.5 | 23.5 | |
| M2 | 23.5 | 23.5 | 23.5 | 9 | 23.5 | 23.5 | 47.0 |
| Oligomer-type radiation polymerization initiator (B) | | | | | | | |
| KIP150 | 4.0 | 4.5 | 7.5 | 4.5 | | | |
| Radiation polymerization initiator (D) | | | | | | | |
| R1 | | | 1.0 | | | 0.9 | 0.9 |
| R2 | | | | | | 0.9 | 0.9 |
| R3 | | | | 4.0 | | | |
| Organic solvent | | | | | | | |
| MEK | 31 | 103 | 18 | 91 | 31 | 31 | 98 |
| Toluene | | | | 143 | | | |
| MIBK | 122 | | | | 122 | 122 | |
| Isopropanol | | | 226 | | | | |
| Cyclohexanone | | 55 | 62 | | | | 55 |
| Total | 257.0 | 262.0 | 414.5 | 338.5 | 257.0 | 254.8 | 254.8 |
| Nonvolatile components (%) | 40 | 40 | 26 | 31 | 40 | 40 | 40 |
| Properties of cured product | | | | | | | |
| Pencil hardness | 8H | 8H | 8H | 8H | 7H | 8H | 6H |
| Adhesion (%) | 100 | 100 | 100 | 100 | 100 | 100 | 100 |
| SW scratch resistance | Excellent | Excellent | Excellent | Excellent | Excellent | Excellent | Excellent |
| Curling (mm) | 10 | 10 | 15 | 9 | 35 | 40 | 10 |

Notes for Table 1
M1: Dipentaerythritol hexacrylate
M2: Pentaerythritol hexacrylate
KIP150: Oligo(2-hydroxy-2-methyl-1-(4-(1-methylvinyl)-phenyl) propanone)
R1: 1-Hydroxycyclohexyl phenyl ketone
R2: 2-Methyl-1-[4-(methylthio)phenyl]-2-morpholino-propanone-1
R3: 2-Hydroxy-2-methyl-1-(1-phenyl)-propan-1-one

Evaluation of Cured Products

To demonstrate the effects of the composition of the present invention, the cured products obtained from the above-mentioned compositions by coating, drying, and exposure to radiation were evaluated. The evaluation methods used were as follows. The results of the evaluation are shown in Table 2.

Cured coatings on the glass substrates were evaluated according to JIS K5400.

Adhesion (%):

The number of remaining 1 mm×1 mm squares among 100 squares in the cellophane tape cross-cut peeling test according to JIS K5400 was counted to evaluate the adhesion.

Steel Wool (SW) Scratch Resistance:

The Gakushin-type abrasion tester manufactured by Tester Industry Co., Ltd. was reciprocated 30 times using #0000 steel wool with a load of 500 g to evaluated scratch conditions of the coating film surface by naked eye observation. The case where no scratch was found was rated as "Excellent", where there were 1–10 scratches was rated as "Good", and where more than 10 scratches was found was rated as "Bad".

Curling Property Test:

A coating was prepared on a PET film with a thickness of 100 μm using the composition of the present invention, immediately followed by cutting of 10 cm×10 cm strips with a cutter knife. The strips were left at 25° C. and RH 50% for 24 hours to measure the warping mean value (mm) from the four corners.

Effect of the Invention

As described above, the present invention provides a resin composition exhibiting excellent coatability and capable of forming coatings with high hardness, superior scratch resistance, low curling properties, and superb adhesion, particularly well balanced high hardness and low curling properties, on the surface of various substrates, as well as the cured products made from the resin composition.

What is claimed is:

1. A resin composition comprising:
   (A) particles prepared by bonding at least one oxide of an element selected from the group consisting of silicon, aluminum, zirconium, titanium, zinc, germanium, indium, tin, antimony, and cerium, and an organic compound which includes a polymerizable unsaturated group and a group shown by the following formula (1)

$$-\text{X}-\underset{\underset{\text{Y}}{\|}}{\text{C}}-\text{NH}- \quad (1)$$

wherein X represents NH, O (oxygen atom), or S (sulfur atom), and Y represents O or S,
   (B) an oligomeric polymerization initiator having recurring units represented by the following formula (3)

$$\begin{array}{c} \text{CH}_3 \\ | \\ -\text{C}-\text{CH}_2- \\ | \\ \bigcirc \\ | \\ \text{C}=\text{O} \\ | \\ \text{CH}_3-\text{C}-\text{CH}_3 \\ | \\ \text{OH} \end{array} \quad (3)$$

and
   (C) a compound having at least two polymerizable unsaturated groups in the molecule.

2. The resin composition according to claim 1, wherein the organic compound includes a group represented by [—O—C(=O)—NH—] and at least one of the groups represented by [—O—C(=S)—NH—] or [—S—C(=O)—NH—].

3. The resin composition according to claim 1, wherein the organic compound is a compound having a silanol group or a compound which forms a silanol group by hydrolysis.

4. The resin composition according to claim 1, wherein the weight average molecular weight of said oligomeric polymerization initiator is in the range from 400 to 10,000.

5. The composition of claim 1, wherein said oligomeric radiation polymerization initiator is represented by the following formula (4):

$$\begin{array}{c} \left[ \begin{array}{c} \text{CH}_3 \\ | \\ \text{CH}_3-\text{C}-\text{CH}_2 \\ | \end{array} \right]_n -\text{R} \\ \bigcirc \\ | \\ \text{C}=\text{O} \\ | \\ \text{CH}_3-\text{C}-\text{CH}_3 \\ | \\ \text{OH} \end{array} \quad (4)$$

wherein R represents an organic mono-valent group, and n represents an integer from 2 to 45.

6. The composition of claim 5, wherein said compound having at least two polymerizable unsaturated groups is selected from the group consisting of dipentaerythritol hexa(meth)acrylate, dipentaerythritol penta(meth)acrylate, pentaerythritol tetra(meth)acrylate, and ditrimethylolpropane tetra(meth)acrylate.

7. The composition of claim 1, wherein said compound having at least two polymerizable unsaturated groups is selected from the group consisting of dipentaerythritol hexa(meth)acrylate, dipentaerythritol penta(meth)acrylate, pentaerythritol tetra(meth)acrylate, and ditrimethylolpropane tetra(meth)acrylate.

8. The composition of claim 6, wherein said composition comprises, relative to the combined weight of particles (A) and compound (C), 10–95 wt % of compound (C).

9. A process comprising:
   coating a substrate with the composition of claim 6, and curing the composition of claim 6.

10. The composition of claim 1, wherein said composition comprises, relative to the combined weight of particles (A) and compound (C), 10–95 wt % of compound (C).

11. The composition of claim 1, wherein said composition comprises, relative to the combined weight of particles (A) and compound (C), 30–95 wt % of compound (C).

12. A process comprising:
   coating a substrate with the composition of claim 1, and curing the composition of claim 1.

13. A cured product produced by curing the resin composition according to claim 1.

* * * * *